March 9, 1954    B. CAMPRUBI    2,671,866
MOTOR
Filed Feb. 23, 1951    3 Sheets-Sheet 1

INVENTOR.
Bartholomew Camprubi
BY
Harry S. Durarr
ATTORNEY.

INVENTOR.
Bartholomew Camprubi
BY
ATTORNEY.

March 9, 1954     B. CAMPRUBI     2,671,866
MOTOR

Filed Feb. 23, 1951     3 Sheets-Sheet 3

INVENTOR.
*Bartholomew Camprubi*
BY
ATTORNEY.

Patented Mar. 9, 1954

2,671,866

UNITED STATES PATENT OFFICE 2,671,866

MOTOR

Bartholomew Camprubi, Greenford, England, assignor to The Hoover Company, North Canton, Ohio, a corporation of Ohio Application February 23, 1951, Serial No. 212,319

1 Claim. (Cl. 310—235)

This invention relates to motors and more particularly to motor commutators of the molded type in which the segments are molded into an insulating material and to the method of making the same.

It is usual practice to mold commutator segments into a thermosetting synthetic resin such as a phenol condensation product. However, with such an insulating material it is necessary to undercut the insulating material between the segments of the commutator for a number of reasons. The principal reason is that the insulating material tracks on the surface between the segments where arcing occurs. This carbonises the insulating material and thus virtually short circuits the segments. Furthermore, the insulating material tracks over the segments, that is, is spread over the segments which results in arcing across the segments during commutation.

Other insulating materials are known which wear away at substantially the same rate as the copper segments and do not track across the segments during commutation to cause sparking. One such insulating material is a synthetic resin of the melamine type which has good anti-tracking and insulating characteristics and is heat and arc resistant. However, the melamine insulating compounds do not have sufficient strength to hold the segments in place against centrifugal action at high speeds. Additionally, they shrink considerably during the molding process, causing cracking when cooling after molding, thus resulting in looseness between the molded material and the commutator sleeve or shaft.

According to the present invention, two different insulating materials are used in molding the commutators of the present invention. An anti-tracking heat and arc resistant insulating material is positioned between the segments adjacent the periphery of the commutator and the supporting core for the segments is formed of an insulating material having high strength and low shrinkage characteristics.

Specifically, according to one form of the present invention, the segments adjacent the periphery of the commutator are separated by a synthetic resin of the melamine type and the tails of the segments are embedded in a synthetic resin of the phenol-formaldehyde type.

According to one modification of the present invention both materials are molded in situ about the commutator segments.

According to one form the melamine is first molded about the commutator segments so as to extend inwardly beyond the tails of the segments and is formed with an annular rib of dovetail section. The supporting core of phenol-formaldehyde is then molded interiorly of the melamine so as to interlock with the dovetail rib and with the tails of the segments to anchor both the melamine and the segments.

According to another modification of the present invention the outer insulation may be molded separately or otherwise preformed and inserted between the segments adjacent the periphery of the commutator and the inner insulating core molded about the tails of the segments and against the outer insulating material to hold it in place.

In either or both of the foregoing embodiments the commutator may be formed into a ring in any suitable manner and the insulation material thereafter applied thereto. As an alternative, according to the second modification, the outer body of insulating material may be applied to the commutator bar while in the form of a flat bar with the tails of the segments extending from one side of the bar. The bar may then be formed into a ring with the tongues extending inwardly and the insulating material molded thereto as before.

According to one mode of forming a commutator for a small motor, such as those used in suction cleaners, a bar of copper has a number of grooves broached in one face thereof to form tongues projecting from one side thereof. The bars are then bent into ring form with the tongues projecting inwardly parallel to the axis of the ring. The grooves are preferably of stepped form to form narrow slits adjacent the edge of the bar and wider spaces adjacent the free ends of the tongues. The narrow slits will eventually form the spaces between adjacent segments and the metal between the wider spaces, the opposite ends of which may be bent in opposite directions similar to the manner shown in the United States patent to Wilson 2,320,541, dated June 1, 1943, will eventually form anchoring tails to anchor the segments to the insulating core.

According to one embodiment of the present invention the ring formed, as explained above, is placed in a mold which fits about the periphery of the ring. The core of the mold has ribs thereon which extend into the wide spaces between the tails except midway between its top and bottom where it is formed with a dovetail recess, the inner end of which extends beyond the ends of the tails. The empty space thus formed includes an annular dovetail recess inwardly of the tails centrally of the mold, the wide spaces between the tails centrally of their length and the narrow slits between the segments proper. The melamine or other anti-tracking insulating material is then molded into the empty space thus formed and the ring transferred to a second mold. The second mold fits about the periphery of the ring and may have an upstanding pin centrally thereof, the same size as the shaft to which the commutator is to be applied. Alternately, the pin may receive a metal bushing. A core of phenol-formaldehyde insulating material is then molded about the dovetail rib, into the wide spaces between the tails at each end thereof and about the pin or sleeve as the case may be.

The outer surface of the copper ring is then machined off to expose the melamine insulation between the segments.

According to alternative modifications of the present invention the melamine insulation may be preformed and applied to the copper bar or ring prior to the molding of the phenol-formaldehyde core.

According to one of the alternative modifications of the present invention the melamine or other anti-tracking insulation may be premolded in the form of a narrow ring of the same diameter as that of the narrow slits in the copper ring with a plurality of fingers extending axially therefrom. The premolded insulation is then assembled axially to the copper ring with the fingers lying in the narrow slits and the ring of molded material resting against one edge of the copper ring. The ring of molded material may be machined off after the phenol-formaldehyde core is molded.

According to another modification of the present invention the melamine or other anti-tracking material may be molded in the form of a ladder having side bars which may be assembled to the copper bar before it is formed into a ring with the cross bars or rungs of the ladder positioned in the narrow slits and the side bars lying along the ends of the tongues. The copper bar is then bent into ring form and the phenol-formaldehyde core molded thereto as before, after which the side bars of insulating material may be machined off.

According to another of the alternative modifications, strips of melamine insulating material are separately molded and inserted into the narrow slits of the copper bar either before or after it is formed into a ring. The strips may be of rectangular or T-shape in cross-section.

According to another of the alternative modifications of the present invention melamine powder is placed in the narrow slits in the bar which is then bent into ring form to compress the melamine powder to its final volume. At the ends of the bar may be cut across the tongues to form complementary walls to hold the melamine in the end slits until cured by molding. The ring thus formed is then placed in a mold and the phenol-formaldehyde insulating material molded simultaneously with the melamine.

According to another of the alternative modifications of this invention, a fibrous material such as rags, asbestos, glass cloth or paper is impregnated with the melamine or other anti-tracking insulating material and placed in the narrow slits of the bar.

The impregnated material may be formed as a tape to be placed in the narrow slits in a zig-zag arrangement by running the tape along one slot, along the end of the adjacent tongue and into the next slot, and so forth.

A strip of the impregnated material may have tongues punched from the body thereof with the tongues extending outwardly so as to enter the narrow slits between the segments.

A strip of the impregnated material may be slotted with narrow bars between the slats so that the tongues of the bar may extend through the slats with the bars positioned in the narrow slits between the segments.

Other objects and advantages of the present invention will become apparent as the description proceeds when taken in connection with the accompanying drawings in which.

Figure 1:
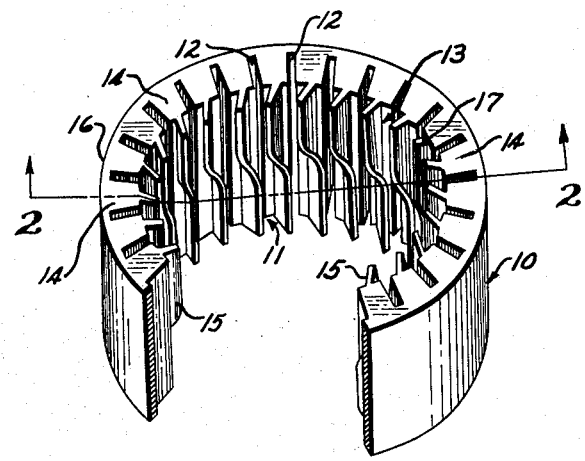
Figure 1 is a perspective view of a copper bar bent to ring form and partially cut away to show the interior construction.

Referring to the drawings and more particularly to Fig. 1, the commutator ring prior to the molding and machining operation is generally indicated by the reference numeral 10. The ring 10 may be formed in a number of different ways. A flat bar 9 (Figs. 6 and 8) of copper may have grooves 11 broached in one face thereof. The grooves 11 are of stepped formation with narrow slits 12 adjacent one face thereof and wider spaces 13 opening through the other face. The grooves form tongues which include commutator segments proper 14 and anchoring tails 15 and a thin strip 16 along one edge of the bar to temporarily hold the segments 14 in their proper relationship. The opposite ends of the tails 15 may be bent in opposite directions as shown at 17 in a manner similar to that disclosed by the United States patent to Wilson 2,320,541. The bar 9 may then be bent into the form of the ring 10 either before or after the bends 17 are made.

Alternately a ring of copper may be extruded in the shape shown at Fig. 1 prior to making the bends 17. The extrusion process may be by the impact or direct extrusion method.

Figure 2:
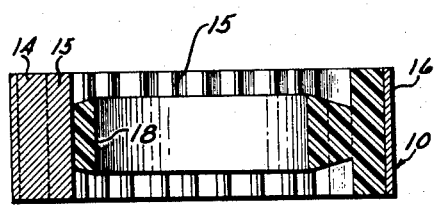
Figure 2 is a cross-sectional view, taken on line 2—2 of Fig. 1, of one modification of the present invention partially completed by having the anti-tracking insulating material molded thereto.
Figure 3:
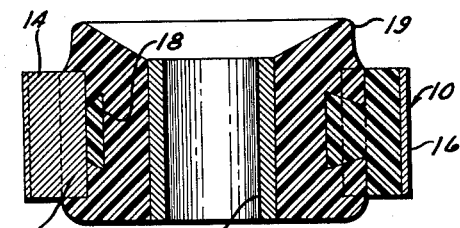
Figure 3 is a cross-sectional view taken on the same line as Fig. 2, of the completed commutator of the modification of Fig. 2.

In the modification of Figs. 2 and 3 the ring 10 is placed in a mold which fits closely about its periphery and has a centrally upwardly extending core having a dovetail groove midway between its ends. The diameter of the groove is less than the inner diameter of the inner edges of the tails 15. At each end beyond the dovetail groove, the core extends to the inner edges of the tails 15 and is provided with splines which extend into the spaces 13 between the tails 15. The core may be divided transversely through the grooves so that it may be removed after the molding operation.

Melamine or other anti-tracking insulating material is then molded about the tongues so as to fill the narrow slits 12 and the wide spaces 13 as well as the dovetail groove in the core so as to form an annular dovetail anchoring rib 18 having portions extending into the wide spaces 13 of grooves 11 as shown in Fig. 2.

The partially completed commutator of Fig. 2 is then transferred to a second mold and a phenol-formaldehyde core in the form shown at 19 of Fig. 3 is moulded about the dovetail rib 18 and between the tails 15 at each end of the dovetail rib 18 to anchor the segments 14 and the melamine to the core 19. If desired, a bushing 20 may be molded into the body 19 of phenolic insulation or the mold may be provided with a central bore of the same size as the shaft to which the commutator is to be applied.

The narrow strip 16 may then be machined off as by turning to expose the melamine insulation in the slits 12. With such a construction it is unnecessary to undercut the insulation between the segments 14 since the melamine insulation will wear away at substantially the same rate as the copper of the segments and no arc will be drawn between the segments during commutation, the melamine being track proof in that it is heat and arc resistant and no burning or arcing will occur across the commutator segments. At the same time the body 19 of phenolic insulating material will form a strong core for the segments 14 and the melamine insulation separating the segments 14.

Figure 4:
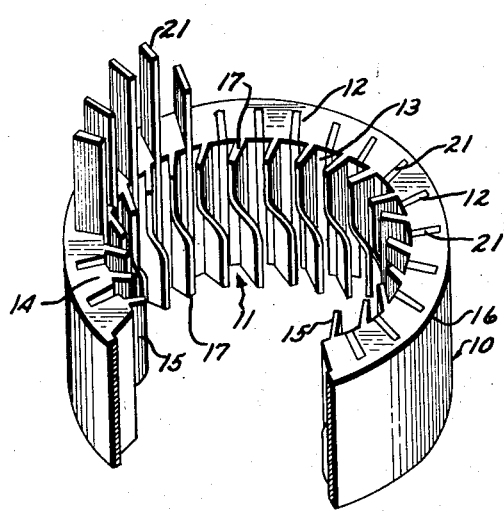
Figure 4 is a perspective view partially broken away showing how one form of premolded anti-tracking insulation is assembled to the ring.

The ring 10 of Fig. 4 may be made by broaching a flat bar of copper or by an extrusion process as previously described. Narrow strips 21 of melamine insulating compound are separately molded and inserted into the narrow slits 12 of the ring 10. Alternately, the bar 9 may be broached and the strips 21 inserted into the slits 12 prior to forming the ring 10, which will cause the segments 14 to grip and hold the strips 21 during the subsequent molding operation.

The ring 10 with the assembled strips 21 is then placed in a mold and a core of the phenolic insulating material molded about the tails 15 of the segments 14, whereby after machining away the strip 16 the tails 15 of segments 14 are firmly anchored to the strong phenolic core by being embedded therein.

Figure 5:
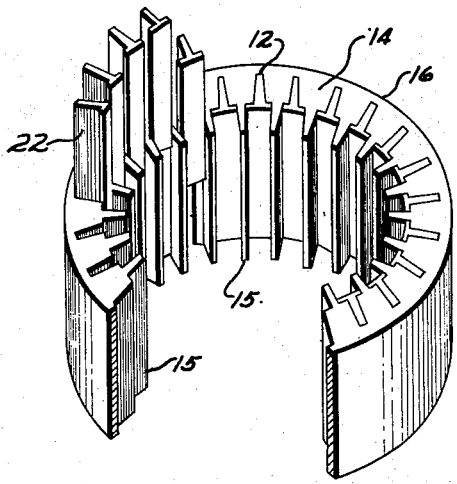
Fig. 5 is a view similar to Fig. 4 showing a different shape of premolded anti-tracking insulation.

In the modification of Fig. 5 the premolded melamine strips 22 are of T-shape in cross-section instead of rectangular as in Fig. 4. Otherwise, the method of construction is the same as that of Fig. 4. The construction of Fig. 5 has the advantage that the cross of the T rests against the lands on opposite sides of the slots 12 so as to hold the melamine strips 22 in the slits 12 against the centrifugal action produced by high speeds.

Figure 6:
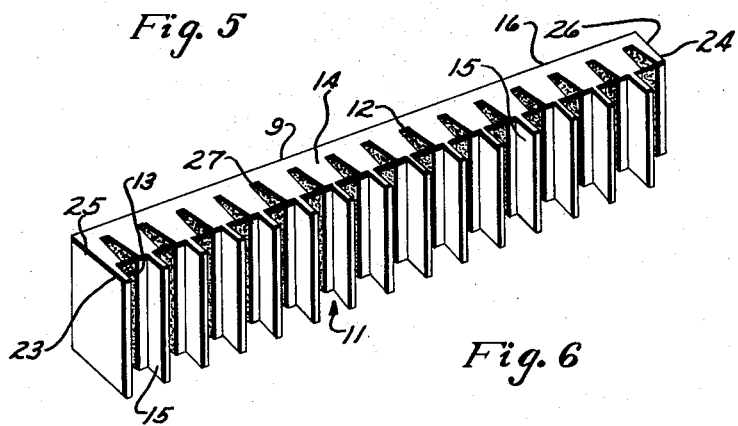
Figure 6 is a perspective view showing another modification of the invention prior to completion.

In Fig. 6 the bar 9 is broached as in the previous modifications except that at the end the bar is cut through one of the tongues on the outside of tail 15 as shown at 23, at one end, and on the inside of the tail, as shown at 24, at the other end so that the mating cuts form a complete tongue. That will leave the walls 25 and 26 closing the edges of the end slits 12.

A melamine powder composition is then filled into the slits 12 and the bar 9 formed into a ring causing the segments 14 to compress the melamine powder 27 to its final volume. The ring is then placed in a mold and a phenolic insulating material molded therein which will embed the tails 15 of the segments 14 into the phenolic core. The bends 17 can be made either before or after the ring 10 is formed.

Figure 7:
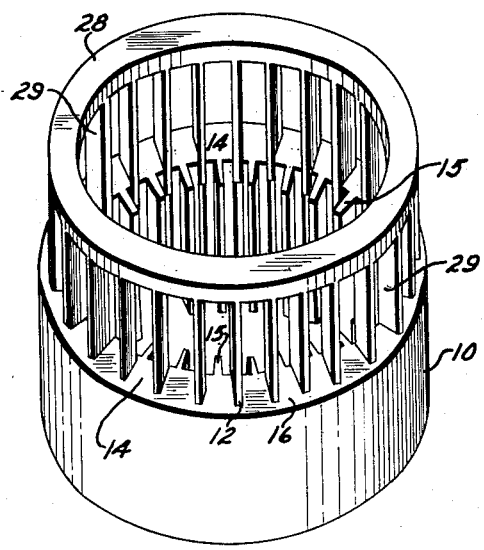
Figure 7 is a perspective view of another modification of premolded anti-tracking insulation being assembled to the commutator ring.

In Fig. 7 a premolded melamine insulator in the form of a ring 28 with fingers 29 extending axially therefrom is assembled edgewise to the ring 10 with the fingers 29 entering the narrow slits 12. The bends 17 may be formed before or after the assembly of the melamine insulator, after which a core of phenolic insulation is molded inside the ring as before.

After the molding operation, the ring 28 and narrow strip 16 may be machined off by turning to expose the melamine insulation in the slits between the segments 14.

Figure 10:
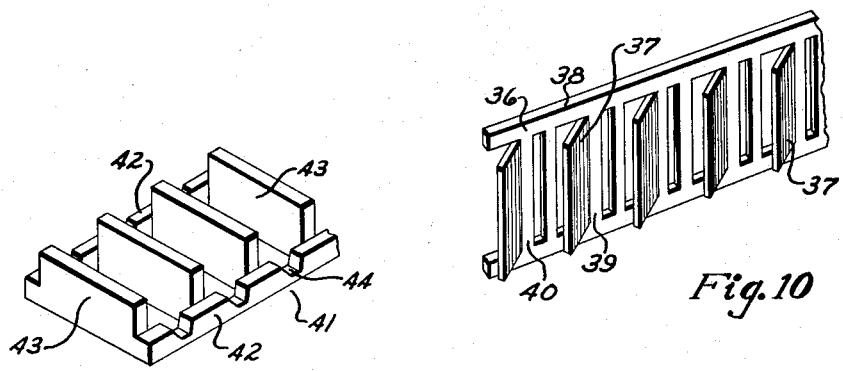
Figures 8, 9 and 10 are perspective views of alternative forms of the present invention showing a preformed anti-tracking insulation of impregnated fibrous material prior to assembly to the commutator ring.
Figure 9:
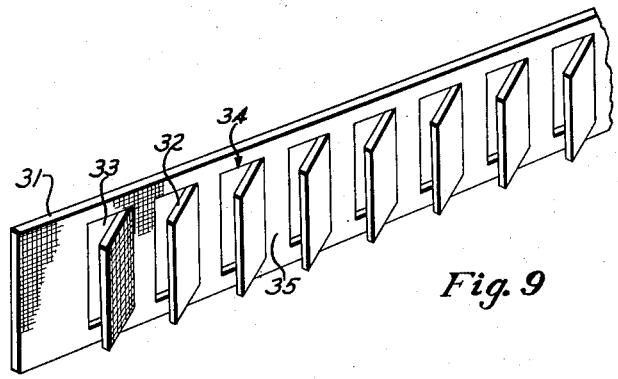
Figure 8:
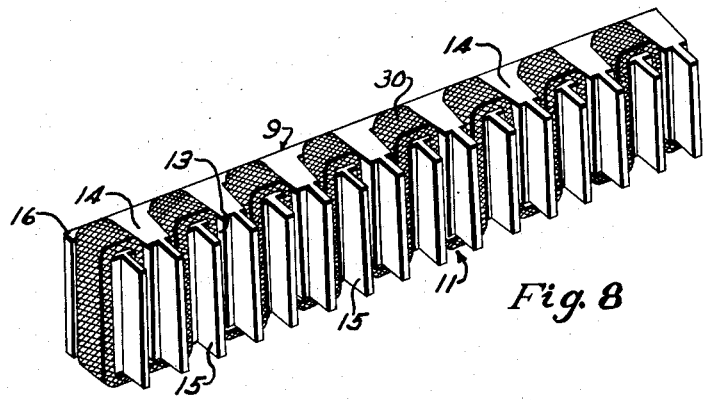

In the modifications of Figs. 8 to 10 inclusive, a fibrous material such as rags, paper, asbestos cloth or glass cloth may be impregnated with the melamine insulating material prior to assembly with the slotted copper bar 9.

According to the modification of Fig. 8 the impregnated material is formed or cut into the shape of a tape 30, wound in a zig-zag arrangement lengthwise through the narrow slits 12 and across the opposite ends of alternate segments 14 as shown. The bar 9 is then formed into a ring, the phenolic core molded therein and the ends of the tape 30 cut away during the final machining operation.

According to the modification of Fig. 9 the impregnated material is cut into the form of a strip 31 and tabs 32 are stamped therefrom to form openings 33, side rails 34 and cross bars 35. The ends of the tabs 32 are entered into the narrow slits 12 of bar 9 with the tails 15 of the segments 14 extending upwardly through the openings 33. The tape 31 is then forced downwardly into the grooves 13 so that the side rails 34 extend along the ends of the segments 14 and the cross bars 35 lie in the grooves 13, the impregnated material being sufficiently flexible for that purpose. The bar 9 is then formed into a ring 10 as before compressing the impregnated tape 31 between the segments and the phenolic insulating core molded into the ring as in the other modifications. The side rails 34 may be removed during the final machining operation.

In the modification of Fig. 10 the impregnated material is cut into a strip 36, stamped to form tabs 37, side rails 38 and cross bars 39 and 40. The ends of the tabs 37 are inserted into the narrow slits 12 of bar 9, with the side rails 38 extending along the ends of the tails 15 and with the bars 39 and 40 lying on the lands formed on opposite sides of the tails 15. The bar 9 is then formed into a ring, the phenolic core molded therein and the rails 38 removed as in the modification of Fig. 9.

Figure 11:
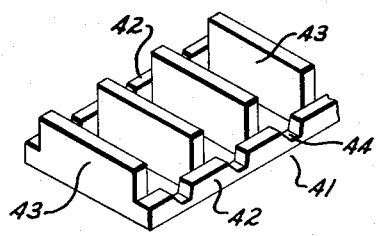
Figure 11 is a perspective view of another preformed insert to be applied to a slotted copper bar prior to forming it into ring form.

In Fig. 11 the melamine insulation is preformed in the shape of a ladder 41 having side rails 42 and rectangular cross bars 43. The side rails 42 are undercut to form fracture points as shown at 44. The free edges of the cross bar 43 are inserted into the narrow slits 12 of bar 9 with the side rails 42 extending along the ends of the segments 14. The bar 9 is then formed into a ring 10 which will cause the side rails 42 to break at fracture points 44 as the ring is formed. The phenolic core is then applied as in the other modifications and the side rails 42 removed during the final machining operation.

According to each of the modifications disclosed herein, the commutator segments are separated from each other at the commutating surface by an insulating material having good anti-tracking, non-arcing and heat resistant properties and the segments 14 are anchored in place by a high strength insulating core which also holds the outer insulation in place.

I do not wish to be limited to the particular structure and method shown and described but wish to include all equivalent variations thereof except as limited by the scope of the claim.

I claim:

A commutator comprising; a plurality of spaced commutator segments arranged in an annulus and having stepped tongues extending radially inwardly to form the segments proper and narrow inwardly extending anchoring tails; a molded body of an anti-tracking arc and heat resistant insulating material molded into the space between said segments, molded into the space between said tails at the central portion of the length of said segments and molded into the form of an anchoring annulus extending inwardly beyond the ends of said tails at said central portion thereof and an insulating core of high strength insulating material molded about the ends of said tails and about said anchoring annulus.

BARTHOLOMEW CAMPRUBI.

References Cited in the file of this patent

UNITED STATES PATENTS

| Number | Name | Date |
|---|---|---|
| 1,325,325 | Janke | Dec. 16, 1919 |
| 1,845,115 | Apple | Feb. 16, 1932 |

FOREIGN PATENTS

| Number | Country | Date |
|---|---|---|
| 70,955 | Sweden | Dec. 15, 1928 |
| 603,905 | Great Britain | July 24, 1948 |
| 622,894 | Germany | Dec. 7, 1935 |
| 732,946 | France | Sept. 28, 1932 |
| 945,445 | France | May 4, 1949 |